*L. B. Sherwin,*

*Potato Washer,*

N⁰ 85,405. Patented Dec. 29, 1868.

Witnesses:

Jno. A. Morgan
G. C. Cotton

Inventor:
L. B. Sherwin
Per Munn & Co.
Attorneys

L. B. SHERWIN, OF HYDE PARK, VERMONT.

Letters Patent No. 85,405, dated December 29, 1868.

---

IMPROVED POTATO-WASHER.

---

The Schedule referred to in these Letters Patent and making part of the same.

---

*To all whom it may concern:*

Be it known that I, L. B. SHERWIN, of Hyde Park, in the county of Lamoille, and State of Vermont, have invented a new and improved Potato-Washer; and I do hereby declare that the following is a full, clear, and exact description thereof, which will enable those skilled in the art to make and use the same, reference being had to the accompanying drawings, forming part of this specification.

This invention relates to a new and improved method of washing potatoes, and other articles; and It consists in agitating the potatoes in the vessel in which they are placed, by revolving a horizontal bar, or agitator, with inclined sides or blades on the bottom of the vessel, and also in providing the vessel with a perforated semicircular cover, and in the general arrangement and combination of the parts of the machine, as will hereinafter be described.

In the drawing—

Similar letters of reference indicate corresponding parts.

Figure 1:
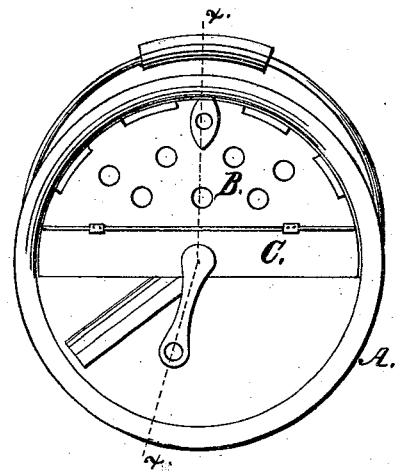
Figure 1 represents a view of the top of the vessel, showing the perforated semicircular cover, and the stay or cross-bar, for supporting the vertical shaft to which the agitator is attached.
Figure 2:
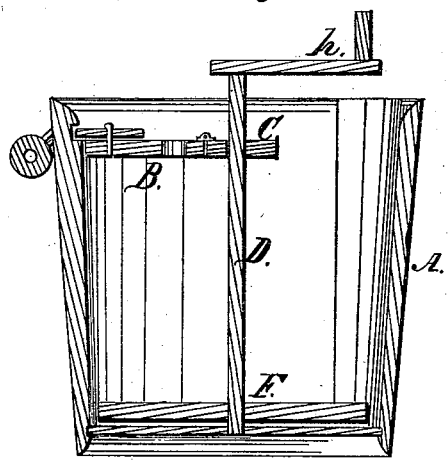
Figure 2 is a vertical section of fig. 1, through the line x x.
Figure 3:
Figure 3 is a detached top view of the agitator, showing its inclined sides or blades.

A is the pail or vessel.

B is the perforated cover.

C is the cross-bar or stay.

D is the vertical shaft, its lower end being supported on the bottom of the vessel, and its upper end supported by the bar C.

E represents the agitator.

This is a horizontal bar attached to the shaft D, forming two blades or inclined planes, the thin edges of which, $f f$, run close to the bottom of the vessel under the potatoes or contents.

The potatoes are consequently raised up and dropped over the backs of the blades $g g$, as the agitator is revolved, by turning the crank $h$, thus constantly changing their position, and in a short time thoroughly cleansing them.

The water may be poured off through the perforated cover B, and clean water introduced as often as may be required for perfecting the operation.

This agitator and perforated cover B may be attached to an ordinary pail, so that the machine may be constructed at slight expense.

I claim as new, and desire to secure by Letters Patent—

The vegetable-washer, consisting of the agitator E, shaft D, crank, $h$, cross-bar C, and hinged perforated cover B, when the upper surfaces of the arms of the agitator are bevelled in opposite directions, forming thin edges $f$, and thick backs $g$, all arranged within the pail A, to operate as herein set forth and shown.

The above specification of my invention signed by me, this 24th day of April, 1868.

L. B. SHERWIN.

Witnesses:
A. E. HOYT,
CHARLES COLEMAN.